United States Patent [19]

Misawa et al.

[11] Patent Number: 4,979,024

[45] Date of Patent: Dec. 18, 1990

[54] VERTICAL CONTOUR ENHANCEMENT SUPPRESSION CIRCUIT

[75] Inventors: Takeshi Misawa; Youichi Sawachi, both of Tokyo, Japan

[73] Assignee: Fuji Photo Film Co., Ltd., Kanagawa, Japan

[21] Appl. No.: 405,226

[22] Filed: Sep. 11, 1989

[30] Foreign Application Priority Data

Sep. 19, 1988 [JP] Japan ................................ 63-232217
Sep. 19, 1988 [JP] Japan ................................ 63-232218
Sep. 19, 1988 [JP] Japan ................................ 63-232219

[51] Int. Cl.$^5$ ........................ H04N 5/208; H04N 9/64
[52] U.S. Cl. ....................................... 358/37; 358/162
[58] Field of Search ............................ 358/37, 96, 162

[56] References Cited

U.S. PATENT DOCUMENTS

3,919,470 11/1975 Blom et al. ............................ 358/162
4,506,293 3/1985 Hurst, Jr. ................................ 358/37

Primary Examiner—John W. Shepperd

[57] ABSTRACT

In an arrangement wherein vertical contour enhancement is performed by subtracting a video signal between horizontal scanning lines and applying a white- or black-level signal before or after the contour (edge portion) of an image based on the result of the subtraction operation, the application of the black-level signal is selectively suppressed to diminish unattractive black borders. In another embodiment, application of the black-level signal to portions having a strong red-signal component is selectively suppressed, thereby diminishing unattractive black borders which appear at red portions of a display image. In still another embodiment, application of the black-level signal to portions where the level of an R-Y signal is high is selectively suppressed, thereby diminishing unattractive black borders which appear at red portions of a display image.

3 Claims, 5 Drawing Sheets

VERTICAL CONTOUR ENHANCEMENT SUPPRESSION CIRCUIT

BACKGROUND

This invention relates to a circuit for selectively suppressing contour enhancement of an image which appears on a display screen owing to a video signal.

A conventional contour enhancement circuit comprises a circuit for subtracting a prescribed component of a video signal in between horizontal scanning intervals, and a circuit for adding a signal representing the result of subtraction to a prescribed component of the video signal. In general, therefore, contour enhancement using a white border is achieved if the result of subtraction is positive, and contour enhancement using a black border is performed if the result of subtraction is negative.

However, owing to the nature of human vision, a black border often is offensive to the eye. In particular, applying a black border to a red portion gives an unnatural appearance. For example, it would be unnatural for a black border to appear on the red lips of the human face.

SUMMARY OF THE INVENTION

An object of the present invention is to provide a circuit capable of selectively suppressing black borders due to contour enhancement.

Another object of the present invention is to provide a circuit capable of selectively suppressing black borders due to contour enhancement produced at red portions of an image.

According to the present invention, the foregoing objects are attained by providing a circuit which, in an arrangement for performing vertical contour enhancement by subtracting a prescribed component of a video signal between horizontal scanning lines and adding a signal representing the result of subtraction to a prescribed component of the video signal, is characterized by having means for detecting a portion at which the level of the signal to be added is negative, and means for suppressing the adding processing in response to detection of the portion at which the level of the signal to be added is negative.

In contour enhancement, the portion at which the result of subtraction is negative is what causes a black border to appear. In accordance with the present invention, it is arranged to suppress processing for adding the signal representing a result of subtraction which is negative. This means that contour enhancement by a black border is suppressed or lightened, thus making it possible to display a natural image.

In another aspect of the invention, there is provided a circuit which, in an arrangement for performing vertical contour enhancement by subtracting a prescribed component of a video signal between horizontal scanning lines and adding a signal representing the result of subtraction to a prescribed component of the video signal, is characterized by having means for detecting a portion at which the level of a red-component signal in the video signal is relatively high, and means for suppressing the adding processing in response to detection of the red-component signal having the relatively high level. In the present invention, addition processing in a contour enhancement circuit is suppressed at portions where the level of the red component in the video signal is high, namely at the red portions of the image. As a result, contour enhancement is suppressed or lightened at red portions, and black borders are particularly diminished at red portions. This makes it possible to display a natural image.

In still another aspect of the invention, there is provided a circuit which, in an arrangement for performing vertical contour enhancement by subtracting a prescribed component of a video signal between horizontal scanning lines and adding a signal representing the result of subtraction to a prescribed component of the video signal, is characterized by having means for detecting a portion at which the level of a signal R-Y derived from the video signal is relatively high, and means for suppressing the adding processing in response to detection of the portion at which the level of the signal R-Y is relatively high.

In the present invention, addition processing in a contour enhancement circuit is suppressed at portions where the level of the signal R-Y derived from the video signal is high, namely at the red portions of the image. As a result, contour enhancement is suppressed or reduced at red portions, and black borders are particularly diminished at red portions. This makes it possible to display a natural image. The signal R-Y is a signal outputted by a video signal processing circuit. Since this is the signal utilized, the circuit arrangement is a simple one.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments will now be described in which the present invention is applied to a still-video camera (also referred to as an electronic still camera).

Figure 1:
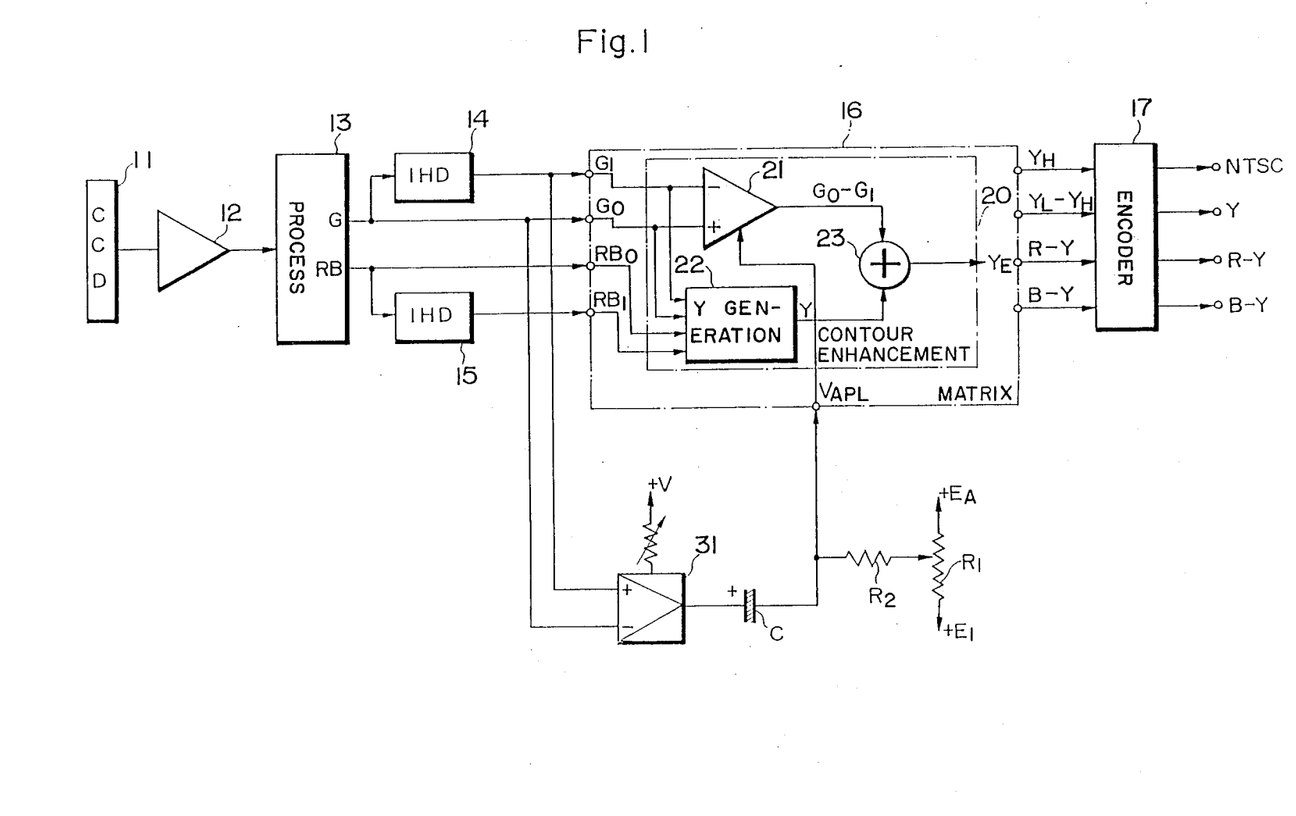
FIG. 1 is a circuit diagram illustrating a first embodiment of the present invention.
Figure 2:
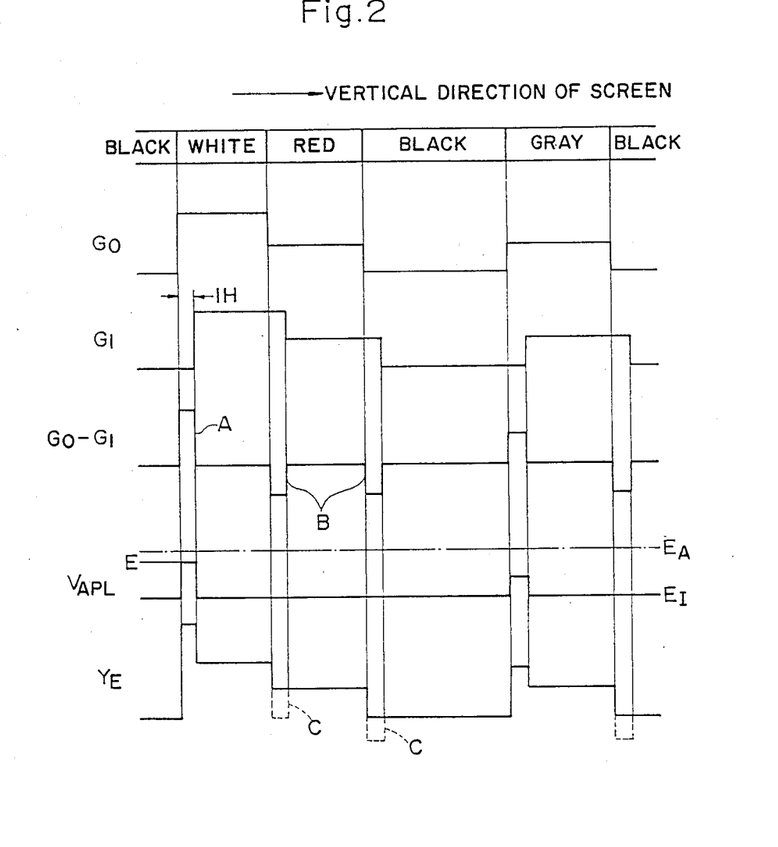
FIG. 2 is a waveform diagram illustrating signal waveforms associated with the circuit of FIG. 1.

FIG. 1 illustrates the electrical construction of a video signal processing circuit in a still-video camera according to a first embodiment of the invention. The processing circuit employs a CCD single-plate color image pick-up system of a G-stripe, RB line sequential filter. FIG. 2 illustrates various signal waveforms associated with the circuit of FIG. 1. The Figure shows a portion in which reproduced images are arranged in the order black, white, red, black, gray and black in the vertical direction of the screen. In FIGS. 1 and 2, red, green and blue color components of a video signal are expressed by R, G and B, the luminance signal is expressed by Y, a high-frequency component of the luminance signal by $Y_H$, and a low-frequency component of the luminance signal by $Y_L$ The circuit of FIG. 1 includes a CCD 11 serving as an image pick-up device. The CCD 11 outputs a video signal, which represents an imaged subject, in synchronization with horizonal and vertical synchronizing signals provided by a control circuit (not shown). The video signal from the CCD 11 is such that G and R components appear alternatingly every pixel in the manner GRGRGR . . . in the first horizontal scanning line, and G and B components appear alternatingly every pixel in the manner GBGBGB . . . in the second horizontal scanning line. This video signal is fed into a process circuit 13 after being amplified by a preamplifier circuit 12.

The process circuit 13 subjects the input video signal to separation processing and outputs a G signal and an RB line sequential signal. The RB line sequential signal is a signal in which R and B signals changeover alternatingly every single horizontal scanning interval (1H).

The G signal and RB line sequential signal are each applied directly to a matrix circuit 16 (in which these signals are referred to as a $G_0$ signal and $RB_0$ signal, respectively). The G signal and RB line sequential signal are also applied to the matrix circuit 16 via respective 1H delay circuits 14, 15 to each be delayed by one horizontal scanning interval before entering the matrix circuit 16 (in which these signals are referred to as a $G_1$ signal and $RB_1$ signal, respectively).

The matrix circuit 16 processes these input signals $G_0$, $G_1$, $RB_0$, $RB_1$ and outputs signals $Y_H$, $Y_L$-$Y_H$, R-Y and B-Y. These output signals enter an encoder 17, from which a video signal in the NTSC format, a Y signal, an R-Y signal and a B-Y signal are outputted. Since the Y signal outputted by the matrix circuit 16 and encoder 17 is contour-enhanced, it should be expressed by $Y_E$, as will be set forth later. For the meantime, however, this signal will be expressed by Y.

Since the circuit described above is well known, a more detailed description of the signal processing is deleted.

The matrix circuit 16 includes a contour enhancement circuit 20. The G signal and Y signal are used in the contour enhancement circuit 20 in this embodiment. The $G_0$ signal and the $G_1$ signal lagging behind it by 1H (see also FIG. 2) are applied to a differential amplifier 21, which outputs the differential signal $G_0$-$G_1$. Meanwhile, the signals $G_0$, $G_1$, $RB_0$, $RB_1$ are applied to a Y-signal generating circuit 22, which forms the Y signal. This Y signal and the differential signal $G_0$-$G_1$ are applied to an adder circuit 23, whereby there is obtained a contour-enhanced luminance signal $Y_E$. The amplification factor of the differential amplifier 21 is controlled by a control signal $V_{APL}$.

The circuit which generates the control signal $V_{APL}$ will now be described. The $G_0$ signal and $G_1$ signal are applied also to a differential amplifier circuit 31, from which the differential signal $G_0$-$G_1$ is obtained. The amplification factor of this differential amplifier circuit 31 is also variable. The output side of the differential amplifier circuit 31 is connected to an input terminal for the control signal $V_{APL}$ through a capacitor C. Also connected to the input terminal via a resistor $R_2$ is the output terminal of a variable voltage divider resistor $R_1$. A voltage $E_A$ is impressed upon one end of the variable voltage divider resistor $R_1$, and a voltage $E_I(E_A > E_I)$ is impressed upon the other end of this resistor. The voltage $E_A$ corresponds to the level of a control signal which applies maximum contour enhancement, namely the maximum amplification factor of the differential amplifier circuit 21. The voltage $E_I$ performs no, or almost no, contour enhancement. In other words, the voltage $E_I$ corresponds to the level of a control signal that is for making the amplification factor of the differential amplifier circuit 21 a value near zero.

As will be understood from FIG. 2, the differential signal $G_0$-$G_1$ includes a portion A indicating a positive level and a portion B indicating a negative level. When the portion A indicating a positive level is added to the luminance signal Y, luminance become much higher at this portion. This appears as a white border on the display screen. On the other hand, when the portion B indicating a negative level is added to the luminance signal Y, luminance become much lower at this portion, as depicted by the broken line C in signal $Y_E$ of FIG. 2. This appears as a black border on the display screen.

The control signal $V_{APL}$ is indicative of a certain voltage E ($E_I < EE < E_A$) at the portion A indicating the positive level of the differential signal $G_0$-$G_1$, and is indicative of the aforementioned voltage $E_I$ at the other portion which includes the portion B indicating the negative level. Accordingly, since the control signal $V_{APL}$ is applied to the differential amplifier circuit 21 of the contour enhancement circuit 20 to control the amplification factor thereof, contour enhancement is carried out only at the portion A where the differential signal $G_0$-$G_1$ indicates the positive level, and absolutely no or almost no contour enhancement is performed at the other portion which includes the portion B indicating the negative level. Accordingly, absolutely none or almost none of the the signal portions C which give the black borders appear in the signal $Y_E$, and black borders are suppressed or lightened on the display screen. The degree of contour enhancement of the portion that carries out the enhancement can be set at will by varying the output voltage of the variable potential dividing resistor $R_1$ or the amplification factor of the differential amplifier circuit 31.

Another example of a method of selectively suppressing contour enhancement besides varying the amplification factor of the differential amplifier circuit as described above is to control the adding operation of the adder circuit 23. In other words, contour enhancement can be suppressed by inhibiting addition.

Figure 3:
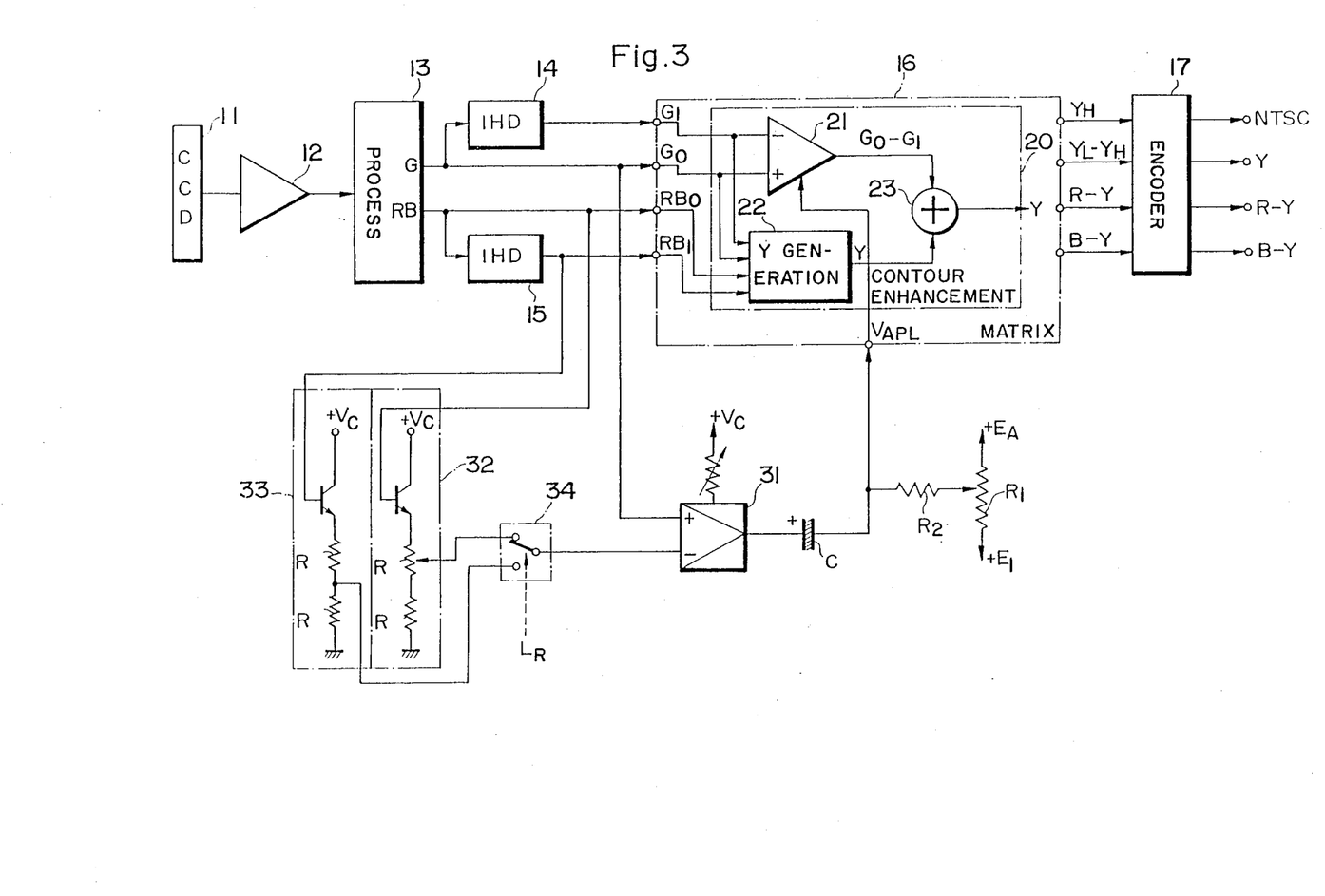
FIG. 3 is a circuit diagram illustrating a second embodiment of the present invention.
Figure 4:
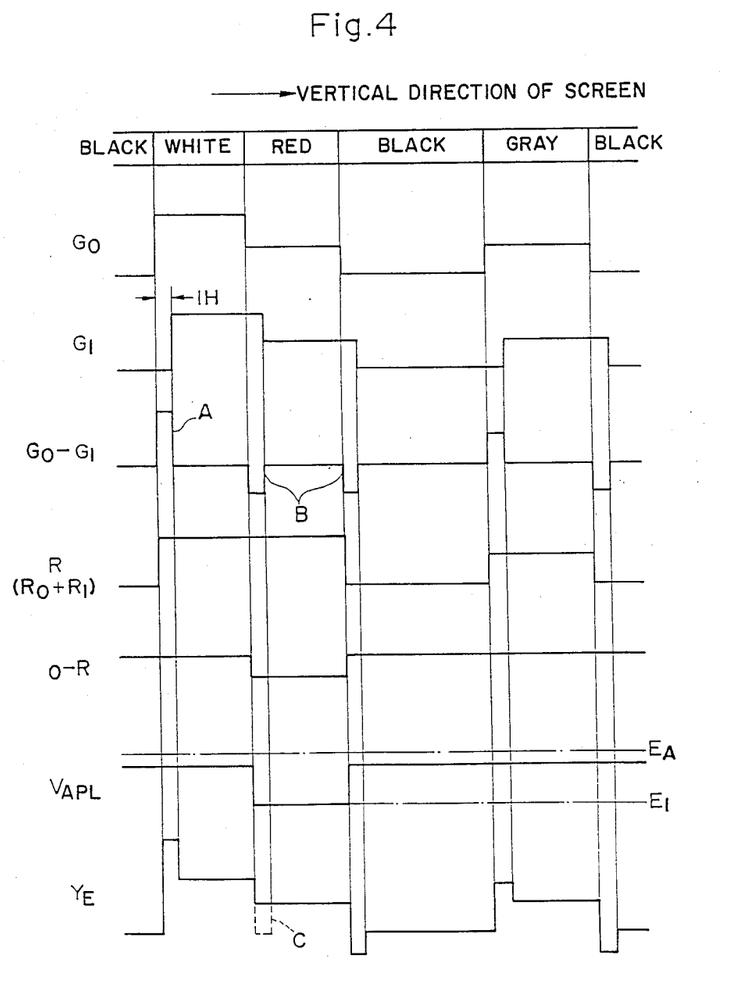
FIG. 4 is a waveform diagram illustrating signal waveforms associated with the circuit of FIG. 3.

FIGS. 3 and 4 illustrate a second embodiment, in which Fig. 3 illustrates the electrical construction of a video signal processing circuit in a still-video camera, and FIG. 4 illustrates signal waveforms associated with the circuit of Fig. 3. It should be noted that portions identical with those shown in FIGS. 1 and 2 are designated by like reference characters and need not be described again. The circuit for generating the control signal $V_{APL}$ differs from that of the first embodiment and therefore will be described in detail. Here the $RB_0$ signal is applied to an amplifier circuit 32 which includes a transistor. Voltage dividing resistors $R_3$, $R_4$ are connected in series with the output side of the amplifier circuit 32. The resistor $R_3$ is a variable resistor. The output voltage of this variable resistor enters one input terminal of a changeover switching circuit 34. Similarly, the $RB_1$ signal enters an amplifier circuit 33 which includes a transistor, and the output voltage of a voltage divider circuit, which comprises resistors $R_5$, $R_6$ in series connection provided on the output side of the amplifier circuit 3, enters the other input terminal of the changeover switching circuit 34. The variable resistor $R_3$ of the amplifier circuit 2 is for effecting adjustment in such a manner that the output voltage of the amplifier circuit 32 and the output voltage of the amplifier circuit 33 will be equal in the same portions of the image.

The changeover switching circuit 34 has its changeover operation controlled by a line pulse signal $L_r$. The signals $RB_0$, $RB_1$ are line sequential signals of the R signal and B signal, and the signal $RB_1$ is a signal which lags behind the signal $RB_0$ by 1H. Accordingly, the changeover switching circuit 34 has its changeover operation controlled every 1H by the signal Lr in such a manner that only the R signal will pass through the switching circuit 34 at all times. The $R_0$ signal represents the R component of the $RB_0$ signal, and the $R_1$ signal represents the R component of the $RB_1$ signal. Hereinafter, the signals $R_0$ and $R_1$ alternately appearing at the output terminal of the changeover switching circuit 34 every 1H will be expressed by $R_0+R_1$ or R. The changeover switching circuit 34 of course can be realized by a semiconductor switching circuit.

The output signal R of the changeover switching circuit 34 is applied to one input terminal of the differential amplifier circuit 31. The $G_0$ signal is applied to the other input terminal of the differential amplifier circuit 31. Thus, a differential signal $G_0$-R is obtained from the differential amplifier circuit 31. The amplification factor of the circuit 31 also is variable. The output side of the differential amplifier circuit 31 is connected to the input terminal for the control signal $V_{APL}$ through the capacitor C. As in the first embodiment, the output terminal of the variable voltage dividing resistor $R_1$ is connected to this input terminal via the resistor $R_2$.

As will be understood from FIG. 4, the differential signal $G_0$-$G_1$ outputted by the differential amplifier circuit 21 includes a portion A indicative of the positive level and the portion B indicative of the negative level. When the portion A indicating the positive level is added to the luminance signal Y, the luminance becomes much higher in this portion. This appears as a white border on the display screen. On the other hand, when the portion B indicating a negative level is added to the luminance signal, luminance become much lower at this portion, as depicted by the broken line C in signal $Y_E$ of Fig. 4. This appears as a black border on the display screen.

With the voltage set by the variable voltage dividing resistor $R_1$ serving as a reference, the control signal $V_{APL}$ is indicative of a certain voltage E ($E_I<E<E_A$) at the portion where the output signal $G_0$-R of the differential amplifier circuit 31 is positive (where the output signal is larger than the voltage set by the resistor $R_1$), and is indicative of the aforementioned voltage $E_I$ at the negative portion of the signal $G_0$-R, namely the portion at which the level of the R signal is somewhat higher (the portion at which red or a color near red is displayed on the screen). Accordingly, since the control signal $V_{APL}$ is applied to the differential amplifier circuit 21 of the contour enhancement circuit 20 to control the amplification factor thereof, contour enhancement is carried out only at the portion A where the differential signal $G_0$-R indicates the positive level, and absolutely no or almost no contour enhancement is performed at the portion B indicating the negative level. As a result, contour enhancement is suppressed at locations on the screen where the color red is displayed. For example, absolutely none or almost none of the signal portions which give the black borders appear in the signal $Y_E$, as indicated by C, and black borders are suppressed or lightened on the display screen. The degree of contour enhancement of the portion that carries out the enhancement can be set at will by varying the output voltage of the variable voltage dividing resistor $R_1$ or the amplification factor of the differential amplifier circuit 31.

Another example of a method of selectively suppressing contour enhancement besides varying the amplification factor of the differential amplifier circuit as described above is to control the adding operation of the adder circuit 23. In other words, contour enhancement can be suppressed by inhibiting addition.

Figure 5:
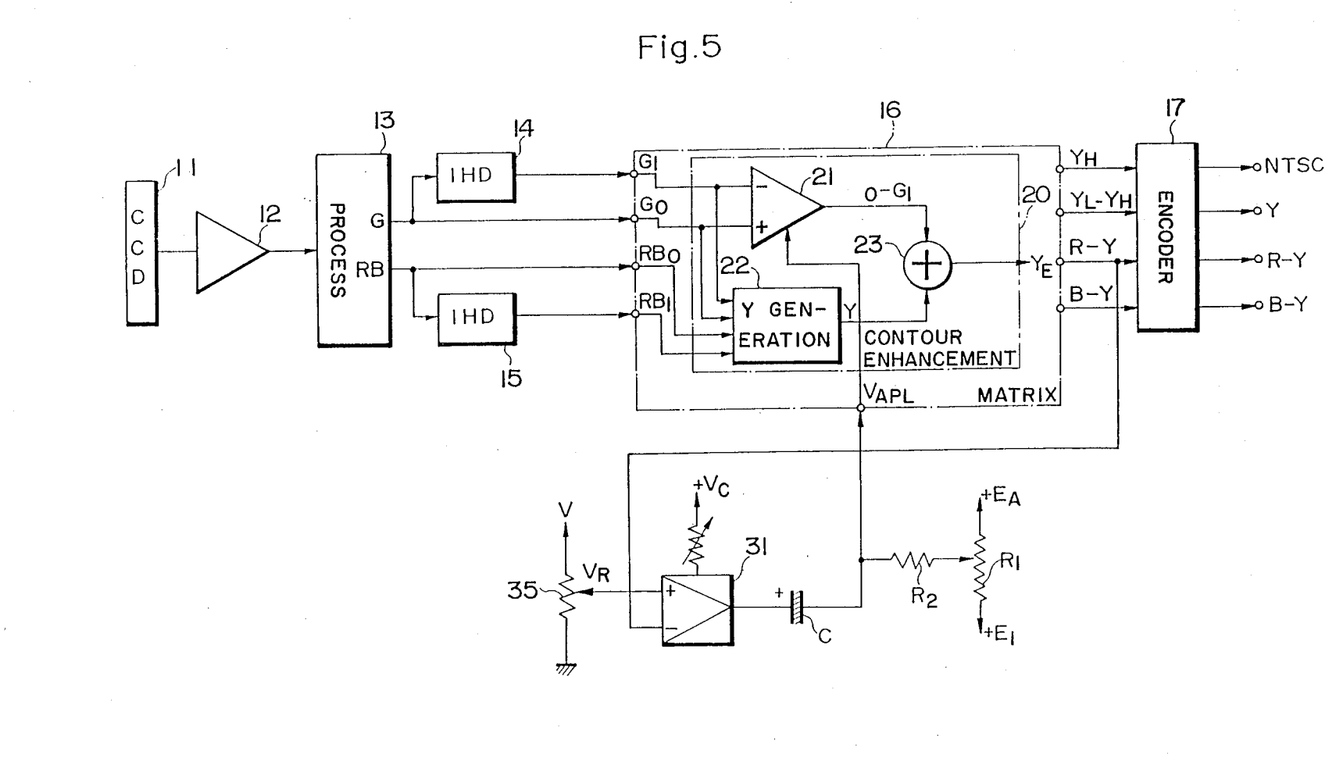
FIG. 5 is a circuit diagram illustrating a third embodiment of the present invention.
Figure 6:
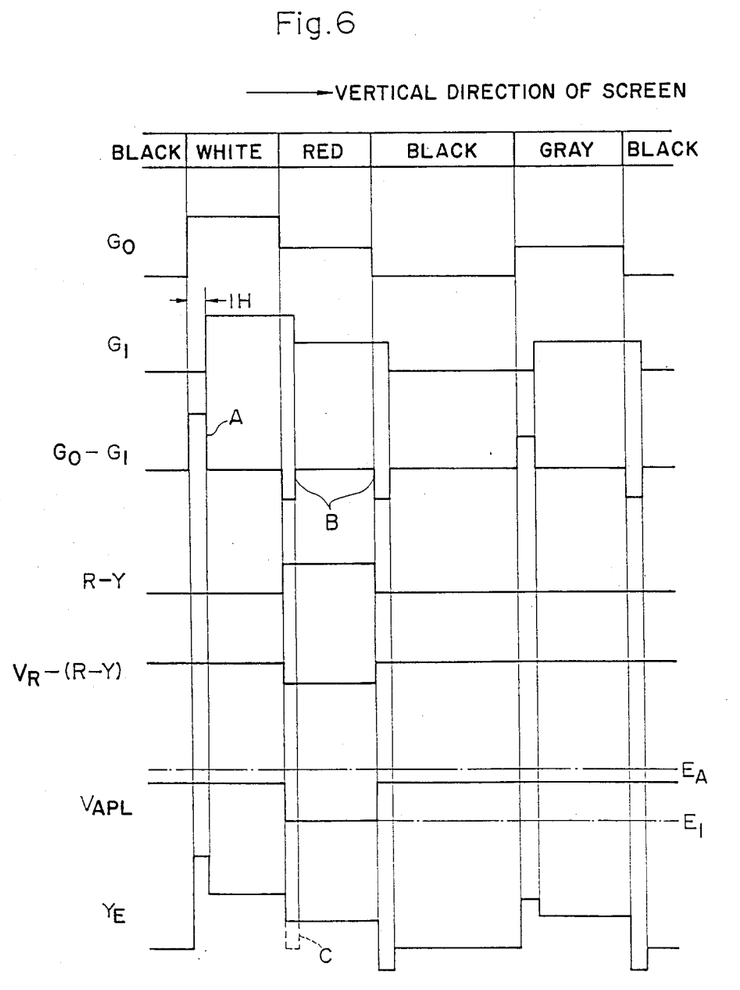
FIG. 6 is a waveform diagram illustrating signal waveforms associated with the circuit of FIG. 5.

FIGS. 5 and 6 illustrate a third embodiment, in which FIG. 5 illustrates the electrical construction of a video signal processing circuit in a still-video camera, and FIG. 6 illustrates signal waveforms associated with the circuit of Fig. 5. It should be noted that portions identical with those shown in FIGS. 1 and 2 are designated by like reference characters and need not be described again.

The circuit for generating the control signal $V_{APL}$ differs from that of the foregoing embodiments and therefore will be described in detail. Here a constant reference voltage signal $V_r$ generated by a reference voltage generating circuit 35 is applied to the positive input terminal of the differential amplifier 31. The reference voltage $V_r$ is variable. The signal R-Y outputted by the matrix circuit 16 enters the negative input terminal of the differential amplifier circuit 31. The latter outputs a differential signal $V_r$-(R-Y) representing the difference between these two signals. The amplification factor of this circuit 31 also is variable. The output side of the differential amplifier circuit 31 is connected to the input terminal for the control signal $V_{APL}$ through the capacitor C. As in the first and second embodiments, the output terminal of the variable voltage dividing resistor $R_1$ is connected to this input terminal via the resistor $R_2$.

As will be understood from FIG. 6, the differential signal $G_0$-$G_1$ outputted by the differential amplifier circuit 21 includes a portion A indicative of the positive level and the portion B indicative of the negative level. When the portion A indicating the positive level is added to the luminance signal Y, the luminance becomes much higher in this portion. This appears as a white border on the display screen. On the other hand, when the portion B indicating a negative level is added to the luminance signal, luminance become much lower at this portion, as depicted by the broken line C in signal $Y_E$ of Fig. 6. This appears as a black border on the display screen.

As shown in FIG. 6, the signal R-Y exhibits a comparative high level at a portion where the image is red or near red. Accordingly, by appropriately setting the level of the reference voltage signal $V_r$, with the voltage set by the variable voltage dividing resistor $R_1$ serving as a reference, the output $V_r$-(R-Y) of the differential amplifier circuit 31 becomes zero (lower than the voltage set by the resistor $R_1$) in the red or near-red portion of the image, and the output $V_r$-(R-Y) becomes positive in the other portions. As a result, the control signal $V_{APL}$ is indicative of a certain voltage E ($E_I<E<E_A$) at the portion where the output signal $V_r$-(R-Y) of the differential amplifier circuit 31 is positive, and is indicative of the aforementioned voltage $E_I$ at the negative portion of the signal $V_r$-(R-Y), namely the portion at which the level of the R signal is somewhat higher (the portion at which red or a color near red is displayed on the screen). Accordingly, since the control signal $V_{APL}$ is applied to the differential amplifier circuit 21 of the contour enhancement circuit 20 to control the amplification factor thereof, contour enhancement is carried out only at the portion where the differential signal $V_r$-(R-Y) indicates the positive level, and absolutely no or almost no contour enhancement is performed at the portion indicating the negative level. As a result, contour enhancement is suppressed at locations on the screen where the color red is displayed. For example, absolutely none or almost none of the signal portions which give the black borders appear in the signal $Y_E$, as indicated by C, and black borders are suppressed or lightened on the display screen. The degree of contour enhancement of the portion that carries out the enhancement can be set at will by varying the output voltage of the variable voltage dividing resistor $R_1$ or the amplification factor of the differential amplifier circuit 31.

Another example of a method of selectively suppressing contour enhancement besides varying the amplification factor of the differential amplifier circuit as described above is to control the adding operation of the adder circuit 23. In other words, contour enhancement can be suppressed by inhibiting addition.

As many apparently widely different embodiments of the present invention can be made without departing from the spirit and scope thereof, it is to be understood that the invention is not limited to the specific embodiments thereof except as defined in the appended claims.

What is claimed is:

1. A vertical contour enhancement suppression circuit in system which performs vertical contour enhancement by subtracting a prescribed component of a video signal between horizontal scanning lines and adding a signal representing the result of subtraction to a prescribed component of the video signal, said circuit comprising:
    means for detecting a portion at which the level of said signal to be added is negative; and
    means for suppressing the adding processing in response to detection of the portion at which the level of the signal to be added is negative.

2. A vertical contour enhancement suppression circuit in system which performs vertical contour enhancement by subtracting a prescribed component of a video signal between horizontal scanning lines and adding a signal representing the result of subtraction to a prescribed component of the video signal, said circuit comprising:
    means for detecting a portion at which the level of a red-component signal in said video signal is relatively high; and
    means for suppressing the adding processing in response to detection of the red-component signal having the relatively high level.

3. A vertical contour enhancement suppression circuit in system which performs vertical contour enhancement by subtracting a prescribed component of a video signal between horizontal scanning lines and adding a signal representing the result of subtraction to a prescribed component of the video signal, said circuit comprising:
    means for detecting a portion at which the level of a signal R-Y derived from said video signal is relatively high; and
    means for suppressing the adding processing in response to detection of the portion at which the level of the signal R-Y is relatively high.

* * * * *